Patented Oct. 25, 1949

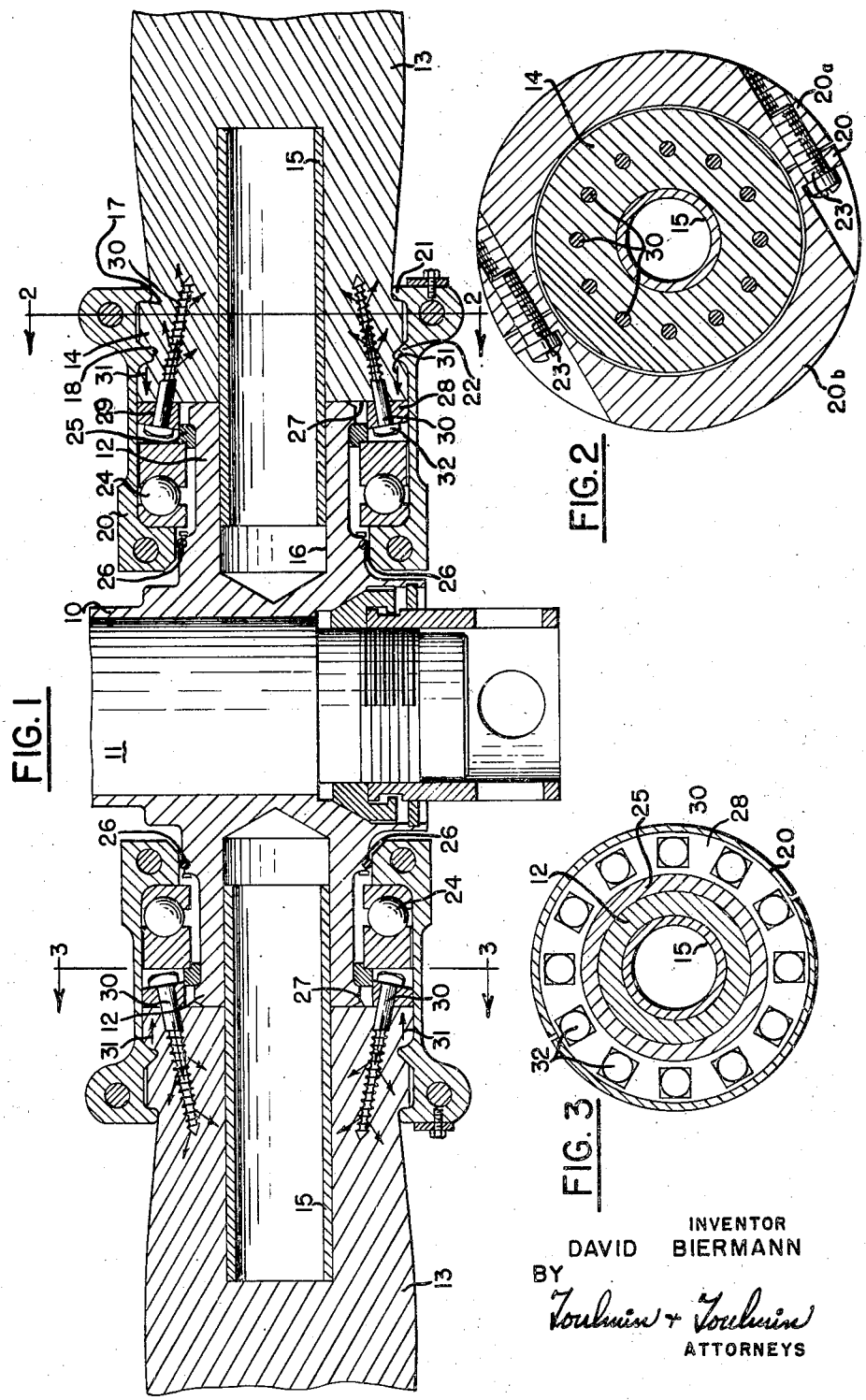

2,485,809

UNITED STATES PATENT OFFICE 2,485,809

PROPELLER MOUNTING

David Biermann, Piqua, Ohio, assignor to Hartzell Industries, Inc., Piqua, Ohio, a corporation of Delaware Application May 16, 1946, Serial No. 670,205

4 Claims. (Cl. 170—173)

This invention relates to improvements for retaining propeller blades in the propeller hub, and is particularly applicable to blades made of wood, compressed wood, laminated wood or plastic materials, and while especially adapted to propeller blades made of the aforementioned materials, yet is not limited to the materials referred to but is adapted for use with propeller blades of non-ferrous materials, or even the ferrous materials, if desired.

While propeller blades made of wood, or reinforced wood, have certain advantages, yet one of the disadvantages of such blades is the relatively low shear stress that can be absorbed by the blade shank for securing the blades to the propeller hub.

It is therefore an object of this invention to provide an improved construction for a blade shank of a propeller blade wherein the shear stresses in the blade shank are more uniformly distributed throughout the cross-section of the blade shank.

Still another object of the invention is to provide a structure for holding the shank of a propeller hub by engaging the periphery of the blade shank to hold the blade upon the propeller hub and to provide means whereby the shear stresses around the periphery of the blade shank are transmitted into the body of the shank toward the axis thereof and re-distributed throughout the body of the blade shank.

It is still another object of the invention to provide an improved means for retaining a non-ferrous propeller blade in a propeller hub by annular ring means around the periphery of the blade shank and to provide means for transmitting axial shear stresses from the periphery of the blade shank toward the axis of the shank to thereby distribute the shear stresses throughout a greater area within the blade shank.

It is still another object of the invention to provide an improved propeller blade mounting in accordance with the foregoing object wherein the shear stresses in the blade shank are re-distributed by means of screws threaded into the blade shank upon axes which follow the periphery of a cone in which the axis of the cone coincides with the axis of the blade shank.

Further objects and advantages will become apparent from the drawings and the following description.

Figures 1 is a cross-sectional view taken through the propeller hub and blade shank of a propeller mounting.

Figure 2 is a transverse cross-sectional view taken along line 2—2 of Figure 1.

Figure 3 is a transverse cross-sectional view taken along line 3—3 of Figure 1.

This invention is illustrated as applied to a variable pitch propeller having blades made of laminated wood. However, it is to be understood that the invention is not limited in its application to laminated wood blades, but can be used in connection with any non-ferrous blade, or could be used in connection with ferrous blades, if desired.

In this invention, the propeller hub 10 is carried upon a drive shaft 11. The hub 10 is provided with a plurality of projections 12 upon which the propeller blades 13 are mounted. The propeller blades 13 have a blade shank 14 that receives a tube 15 for positioning in a bore 16 in the radial projection 12.

The blade shank 14 of the propeller blade 13 has the annular recesses 17 and 18 around the periphery thereof and are in axial spaced relationship.

A split ferrule 20 is positioned around the blade shank 14 and has the annular projections or flanges 21 and 22 that extend into the recesses 17 and 18 to secure the blade shank 14 within the split ferrule 20. The two parts 20a and 20b of the split ferrule 20 are secured together by means of screws 23 to thus bind the ferrule upon the blade shank 14. A ball-bearing mounting 24 is disposed between the ferrule 20 and the split thrust ring 25. The thrust ring 25 receives the centrifugal tension of the propeller blade upon operation thereof. An O-ring 26 is provided between ferrule 20 and the hub 10 to allow for lubricant to fill the space around the bearing 24 and prevent loss thereof. The bearing 24 allows rotation of the blade 13 and ferrule 20 relative to the hub 10 for controlling the pitch of the blade 13.

The blade shank 14 is provided with a flat face 27 extending transversely of the shank 14 that is engaging by means of a ring 28 having a co-operating flat face to engage the face 27 of the shank 14.

The ring 28 is provided with a plurality of holes 29 positioned equi-distantly around the ring 28 and are adapted to receive the screws 30. The holes 29, and the screws 30 have their axes disposed upon the periphery of a cone which has its axis coincident with the axis of the blade shank 14, the cone having its apex pointing radially outwardly of the hub 10, that is toward the tip of the propeller blade 13. The screws 30 may be in the form of lag screws suitably driven into the blade shank 14 of the propeller 13 at the angle aforementioned, which in this particular structure is an angle of 9° with the axis of the blade shank 14. It will, of course, be understood that suitable holes can be pre-drilled into the blade shank 14 to relieve the driving friction of the screws 30, and that in materials of suitable character, such as non-ferrous materials, the screws 30 can be machine screws in place of the lag screws shown herein.

The ring 28, while securely fastened to the face 27 of the blade shank 14, is in no way attached to the ferrule 20, and would be freely movable within the ferrule 20 except for the screws 30. Thus, there is no centrifugal tension of the blade 13 carried directly by the ring 28, the ring 28 acting solely as a transfer agent for the tension stresses from the ferrule 20 into the blade shank 14.

With the blade shank constructed in the manner heretofore described, the centrifugal tension, or shear stress developed upon rotation of the blade 13 will be carried by that portion of the blade shank that is axially in alignment with the flanges 21 and 22 on the ferrule 20. The shear stresses thus developed will be applied to the ring 28, following generally the direction of the arrows 31. The shear stresses received by the ring 28 from the blade shank 14 will be transferred to the screws 30, through the medium of the heads 32 thereof, and the stresses so received will be transmitted axially along the shank of the screws 30 so that the stresses will be returned into the blade shank 14 along each of the screws and thus distributed throughout the body of the blade shank 14. The angular positioning of the screws 30, as upon the periphery of a cone with the axis coincident with the axis of the propeller blade 13 causes the stresses received by the screws 30 to be directioned toward the axis of the blade shank 14, and away from the periphery thereof, to relieve the highly stressed peripheral area of the blade shank and more uniformly distribute the stress load throughout the full cross-sectional area of the blade shank.

From the foregoing description, it will be quite apparent that the invention can be applied to any non-metal propeller blade and lag screws be used as the fastening means, or the invention can be applied to metal blades, in which instance the lag screws can be replaced with standard machine screws. Hence, the application of the invention is not limited to any material, but is particularly applicable to non-metal materials because of their lower resistance to shearing when stressed by the centrifugal loads developed upon operation of the aircraft propeller.

While the apparatus disclosed and described herein constitutes a preferred form of the invention, yet it will be understood that the device is capable of mechanical alteration without departing from the spirit of the invention, and that all modifications that fall within the scope of the appended claims are intended to be included herein.

Having thus fully described my invention, what I claim as new and desire to secure by Letters Patent is:

1. Means for mounting a non-ferrous propeller blade upon a propeller hub, comprising the combination, a propeller hub, a split ferrule attached to said hub, said ferrule having an annular flange protruding inwardly of the ferrule, a propeller blade having a blade shank received within said ferrule and having an annular recess receiving said flange, means clamping said ferrule upon said shank, said flange retaining said shank within said ferrule upon development of centrifugal tension in said shank, a member extending transversely of said ferrule inwardly of the outer end thereof abutting the inner end of said shank and unsupported by said ferrule or said hub, said member having an annular portion in axial alignment with said flange to thereby receive shear stresses from said shank, and a plurality of screws in threaded engagement with said shank securing said member against said shank and inclined angularly inwardly toward the axis of said shank to re-distribute stresses received by said member into said shank.

2. Means for mounting a non-ferrous propeller blade upon a propeller hub, comprising the combination, a propeller hub, a split ferrule attached to said hub, said ferrule having an annular flange protruding inwardly of the ferrule, a propeller blade having a blade shank received within said ferrule and having an annular recess receiving said flange, means clamping said ferrule upon said shank, said flange retaining said shank within said ferrule upon development of centrifugal tension in said shank, an annular ring extending transversely of said ferrule inwardly of the outer end thereof abutting the inner end of said shank and unsupported by said ferrule or said hub, an annular portion of said ring being in axial alignment with said flange to thereby receive shear stresses from said shank, and a plurality of screws in threaded engagement with said shank securing said ring against said shank and inclined angularly inwardly toward the axis of said shank to re-distribute stresses received by said ring into said shank.

3. Means for mounting a non-ferrous propeller blade upon a propeller hub, comprising the combination, a propeller hub, a split ferrule attached to said hub, said ferrule having an annular flange protruding inwardly of the ferrule, a propeller blade having a blade shank received within said ferrule and having an annular recess receiving said flange, means clamping said ferrule upon said shank, said flange retaining said shank within said ferrule upon development of centrifugal tension in said shank, an annular ring extending transversely of said ferrule inwardly of the outer end thereof abutting the inner end of said shank and unsupported by said ferrule or said hub, an annular portion of said ring being in axial alignment with said flange to thereby receive shear stresses from said shank, and a plurality of screws in threaded engagement with said shank equi-distantly spaced therearound and disposed as upon the periphery of a cone having its axis co-incident with the axis of said shank and securing said ring against said shank to thereby receive stresses from said ring and distribute the same back into said shank toward the axis thereof.

4. Means for mounting a non-ferrous propeller blade upon a propeller hub, comprising the combination, a propeller hub, a ferrule attached to said hub, said ferrule having a flange protruding inwardly of the ferrule, a propeller blade having a blade shank received within said ferrule and having a recess receiving said flange, means holding said ferrule upon said shank, said flange retaining said shank within said ferrule upon development of centrifugal tension in said shank, a member extending transversely of said ferrule inwardly of the outer end thereof abutting the inner end of said shank and unsupported by said ferrule or said hub, said member having a portion in axial alignment with said flange to thereby receive shear stresses from said shank, and a plurality of screws in threaded engagement with said shank securing said member against said shank and inclined angularly inwardly toward the axis of said shank to re-distribute stresses received by said member into said shank.

DAVID BIERMANN.

REFERENCES CITED

The following references are of record in the file of this patent:

UNITED STATES PATENTS

| Number | Name | Date |
| --- | --- | --- |
| 1,519,163 | Parker | Dec. 16, 1924 |
| 1,573,000 | Heath | Feb. 16, 1926 |
| 1,870,401 | Caldwell | Aug. 9, 1932 |
| 2,127,264 | Lampton | Aug. 16, 1938 |
| 2,368,656 | Gaskell et al. | Feb. 6, 1945 |

FOREIGN PATENTS

| Number | Country | Date |
| --- | --- | --- |
| 512,152 | Great Britain | Aug. 30, 1939 |